United States Patent [19]
Douglas

[11] 3,857,243
[45] Dec. 31, 1974

[54] HYDRAULIC BRAKE BOOSTER AND SYSTEM
[75] Inventor: Joseph W. Douglas, Chelsea, Mich.
[73] Assignee: Chrysler Corporation, Highland Park, Mich.
[22] Filed: Nov. 30, 1972
[21] Appl. No.: 311,029

[52] U.S. Cl.................... 60/538, 60/563, 417/269
[51] Int. Cl............................................. F01b 9/00
[58] Field of Search ............ 60/538, 539, 544, 545, 60/563, 565; 417/269, 270

[56] References Cited
UNITED STATES PATENTS
3,175,509   3/1965   Kuze................................. 417/270
3,473,328   10/1969  Mayhew............................. 60/563
3,514,223   5/1970   Hare.................................. 417/269

FOREIGN PATENTS OR APPLICATIONS
1,337,462   8/1963   France.............................. 60/444

Primary Examiner—Martin P. Schwadron
Assistant Examiner—H. Burks, Sr.
Attorney, Agent, or Firm—Talburtt & Baldwin

[57] ABSTRACT

Booster system for hydraulic brake system including pumping pistons for boosting the fluid pressure applied by a master cylinder, and control valves for preventing the pressure from being boosted beyond a predetermined point.

14 Claims, 8 Drawing Figures

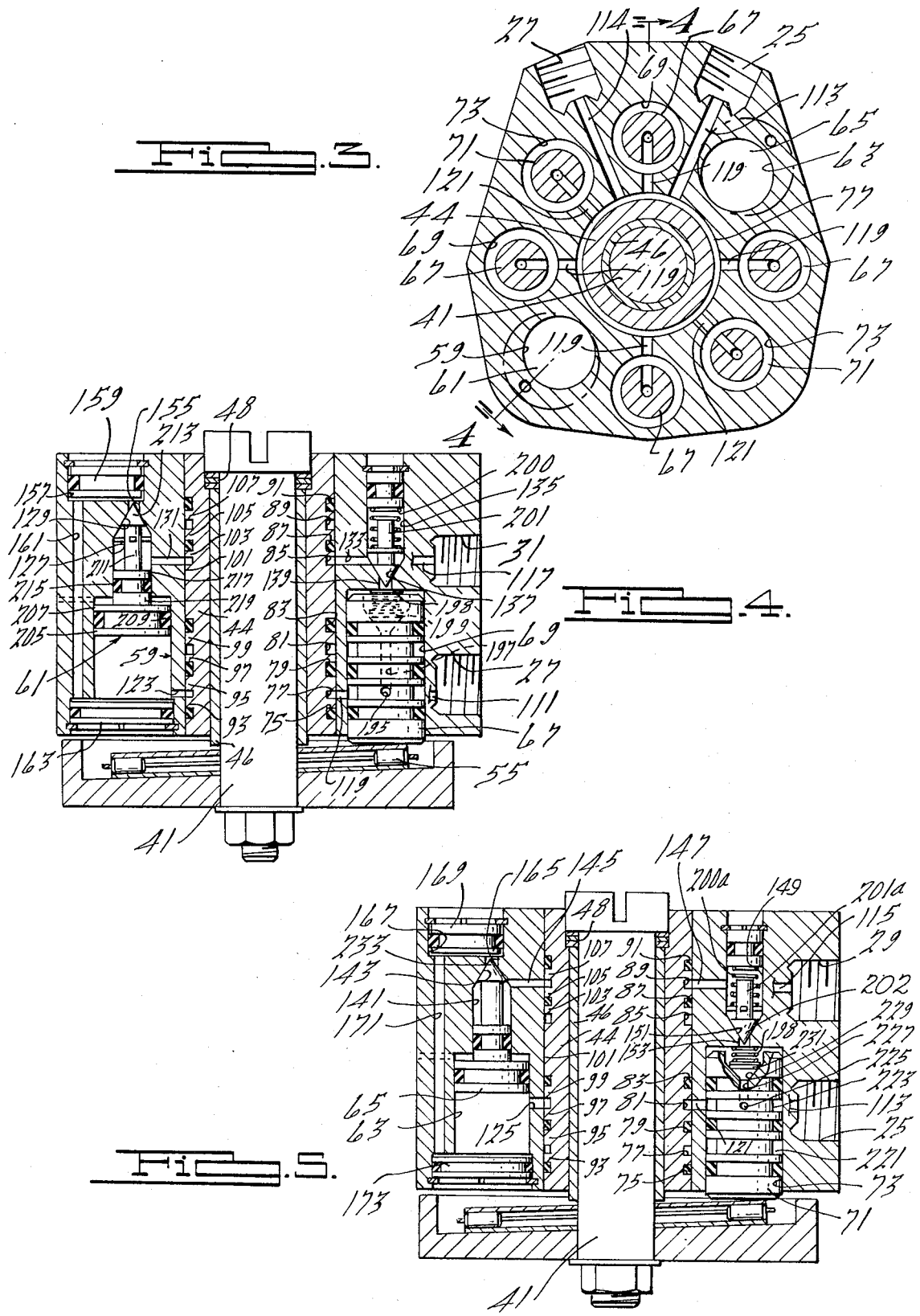

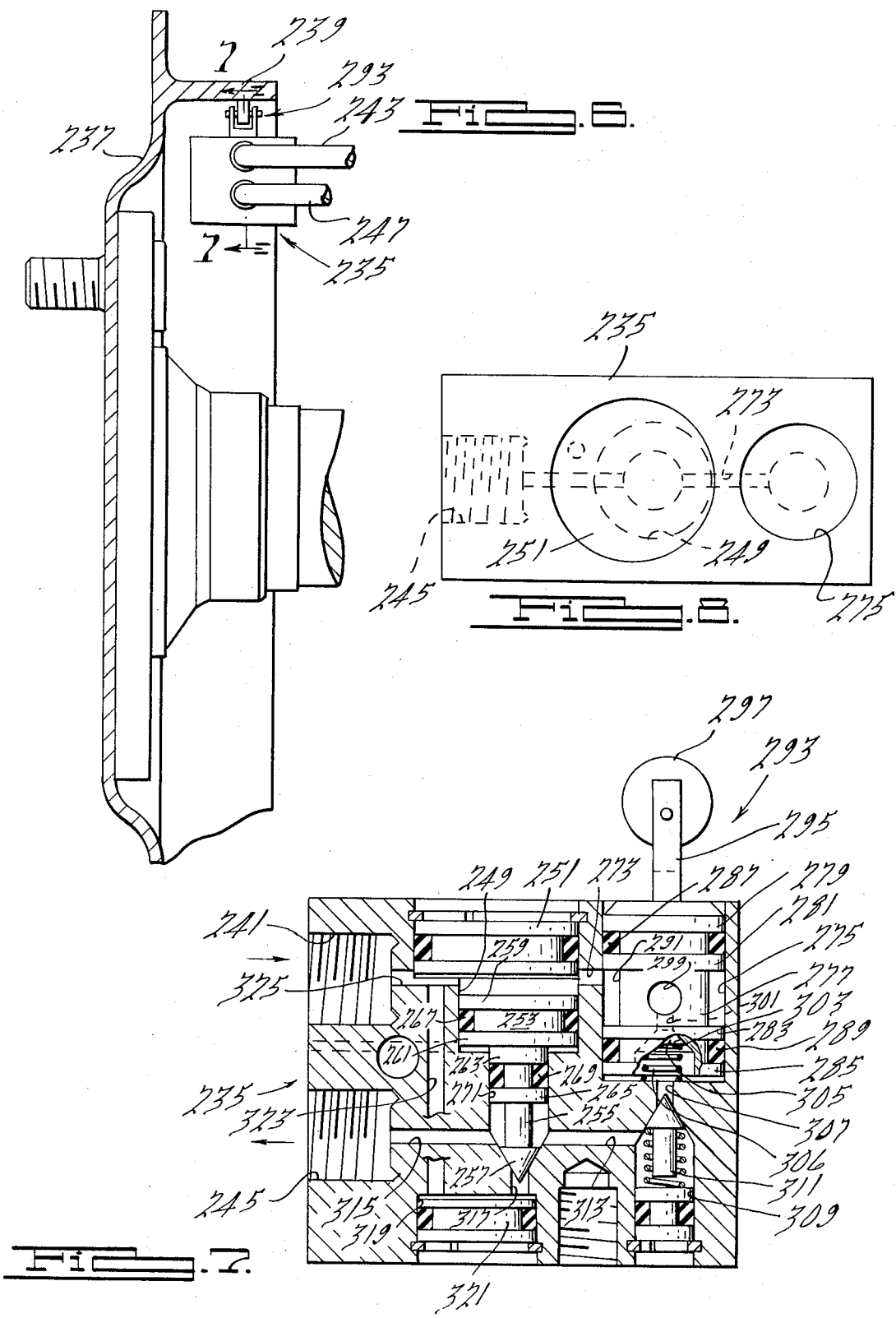

1
HYDRAULIC BRAKE BOOSTER AND SYSTEM

BACKGROUND OF THE INVENTION

This invention relates to hydraulic brake systems for motor vehicles, and more particularly to a hydraulic brake system utilizing a hydraulic booster for boosting the brake applying force.

Most presently available booster devices for providing a power assist for hydraulic brake actuation utilize a vacuum or air brake booster the output of which is limited by the vacuum level or air pressure available. The vacuum brake boosters derive the vacuum from the engine intake manifold. Since the vacuum units are connected to the intake manifold the units permit a varying leak into manifolds and could upset the carefully timed fuel-air mixture ratio, thereby increasing the possibility of greater emissions. Moreover, as the control of emissions becomes more critical over the years, it is quite possible that less and less engine vacuum is available due to emission control limitations.

In an attempt to overcome some of the problems presented by vacuum brake boosters, hydraulic brake boosters have been developed. One type of hydraulic brake booster is located behind the master cylinder between the pedal and the cylinder. It boosts pedal force by applying throttled hydraulic pressure from a power steering pump or other power source against a power piston larger in area than the master cylinder piston. The force is transmitted mechanically by the booster's piston on the master cylinder rod. The force on the piston is controlled by varying the pressure on it. A servo valve varies the pressure on the piston by proportioning the flow from the power steering pump between the hydraulic brake booster and a return line. The position of the servo valve is controlled by a linkage attached to the brake pedal rod and the power piston.

An accumulator may be provided to receive fluid pumped into it for providing reserve brake booster when the power steering pump is not operating. Gas, separated from the fluid by a bladder and under pressure, applies the force for acting on the power piston.

While there are obviously many advantages to this type of system, there are certain features thereof which could, if uncorrected, present problems. For example, using the power steering pump as a power source may put an extra burden on such pump and result in a reduced pump life. If an accumulator or reserve tank is used it may be necessary to recharge the same with gas as a result of gas leakage through the bladder. Furthermore, the cost of the hydraulic booster may be higher than the conventional vacuum booster.

The present invention seeks to overcome many of the problems presented by known vacuum and hydraulic boosters.

BRIEF SUMMARY OF THE INVENTION

Briefly, this invention comprises a booster housing having at least one pumping piston therein and at least one control means for controlling the amount of pressure increase obtained by said pumping piston.

One of the primary objects of this invention is to provide a hydraulic brake booster which is adapted to supply a direct ratio increase produced by the master cylinder, i.e., the booster is located downstream of the master cylinder in the brake hydraulic circuit and increases the pressure applied to the actuating mechanisms in a direct ratio to the pressure emanating from the master cylinder.

Another object of this invention is to provide a hydraulic booster of the type described which avoids upsetting the operation of emission controls.

A further object of this invention is to provide a hydraulic booster such as described, the use of which does not affect steering pump life.

Still another object of this invention is to provide a hydraulic booster of the class described which may be located remotely from the master cylinder.

Another object of this invention is to provide a hydraulic booster which will function effectively even after the engine discontinues operation.

A further object of this invention is to provide a versatile booster unit which may be placed in any of several convenient locations away from the congested engine compartment area.

Another object of this invention is to provide a booster unit of the type described which is effective in operation and economical in construction.

Other objects and advantages of this invention will be made apparent as the description progresses.

BRIEF DESCRIPTION OF THE DRAWINGS

In the accompanying drawings in which several of various possible embodiments are shown.

FIG. 3 is a section taken generally along line 3—3 of FIG. 2, FIG. 3 being on a smaller scale than FIG. 2;

FIG. 4 is a section taken generally along line 4—4 of FIG. 3 showing certain parts and a front piston and outlet rotated out of position to better illustrate their operation;

FIG. 5 is a section generally similar to FIG. 4 showing a rear piston and outlet;

FIG. 6 is an elevation view of a wheel partly in section, illustrating a modification of the booster;

FIG. 7 is an enlarged section taken along line 7—7 of FIG. 6; and

FIG. 8 is a plan view of FIG. 7, certain parts being removed for clarity.

Like parts are shown by corresponding reference characters throughout the various views of the drawings.

DESCRIPTION OF THE PREFERRED EMBODIMENTS

Figure 1:
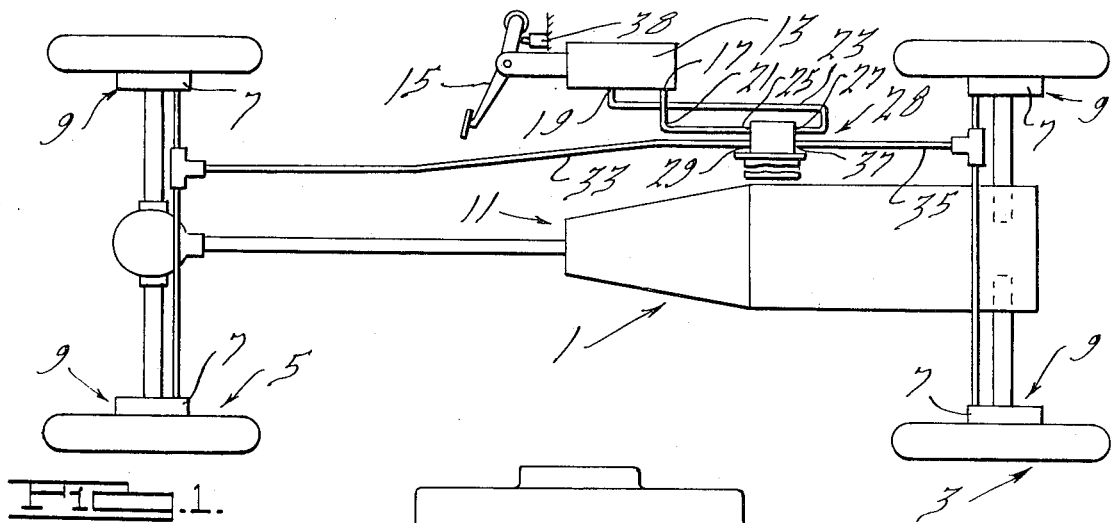
FIG. 1 is a diagrammatic plan view of a vehicle chassis utilizing a brake system and booster of this invention.

Referring now to the drawings, a motor vehicle chassis is diagrammatically and generally shown at 1 and includes, among other things, front wheels 3 and rear wheels 5 each of which has pressure fluid responsive operating means 7 for the brakes 9 associated therewith. The brakes may be of any conventional type, such as disc brakes or drum brakes, for example. An engine, transmission, propeller shaft, differential and axle drive train are shown at 11. A dual master cylinder of the conventional type is shown at 13 and is adapted to be operated by the usual foot pedal 15. As is known, the dual master cylinder has an outlet 17 for supplying fluid to the rear brakes and an outlet 19 for supplying fluid to the front brakes. The outlets 17 and 19 are respectively connected by lines 21 and 23 to booster inlets 25 and 27 of the booster 28 of this invention. Outlets 29 and 31 of the booster are connected by lines 33 and 35 to the pressure fluid responsive brake operating means 7 of the rear brakes and the front brakes, respectively.

As shown, an electric motor 37 is provided for supplying power for the booster 28. The motor 37 may be actuated by a switch 38 connected to the brake pedal and adapted to cause energization of the motor when such pedal is actuated. Motor 37 has its output shaft 39 drivingly connected to a shaft 41 of the booster 28. Shaft 41 is rotatably mounted in booster housing 43 and extends through a tubular collar or sleeve 44 in a bore 45 in the latter. A bushing 46 and seals 48 rotatably mount shaft 41 in the sleeve 44. Attached to the outer end of the shaft 41 is a swash plate 47 having a surface 49 set obliquely with respect to shaft 41. One race plate 51 of a bearing device 53 is secured to surface 49. A circular set of caged rollers 55 engage race plate 51 and another race plate 57 held against rotation.

Housing 43 has a cavity or cylinder 59 (FIGS. 2 and 3) therein for receiving a control valve 61 for controlling the booster operation for the front brakes and a cavity or cylinder 63 (FIGS. 3 and 5) for receiving a control valve 65 for controlling the booster operation for the rear brakes. A plurality of pumping pistons 67 (FIGS. 2 and 3) are slideably mounted in cylinders 69 for pumping fluid used in boosting the pressure applied to the front brake pressure fluid operating means. Similarly a plurality of pumping pistons 71 (FIGS. 3 and 5) are slideably mounted in cylinders 73 for pumping fluid used in boosting the pressure applied to the rear brake pressure fluid operating means. As shown in FIG. 3, four front pumping pistons 67 are provided while only two rear pumping pistons 71 are used. This provides additional pumping for the front brakes which generally require a larger amount of fluid.

Sleeve 44 (FIG. 2) has a plurality of annular grooves 75, 77, 79, 81, 83, 85, 87, 89 and 91 therein separated by lands 93, 95, 97, 99, 101, 103, 105 and 107. Grooves 75, 79, 83, 87 and 91 have annular seals 109 therein while grooves 77, 81, 85 and 89 remain open and form fluid passages as hereinafter explained.

Inlet 27 is connected by a port 111 (FIGS. 2-4) to groove 77, while inlet 25 (FIGS. 3 and 5) is connected by a port 113 to groove 81. Outlet 29 (FIG. 5) is connected by a port 115 to groove 89 and outlet 31 (FIGS. 2 and 4) is connected by a port 117 to groove 85. A plurality of ports 119 (FIGS. 2 and 3) connect the cylinders 69 to the groove 77 and a plurality of ports 121 (FIGS. 3 and 5) connect the cylinders 73 with the groove 81. A port 123 (FIG. 2) connects groove 77 with cylinder 59 and a port 125 (FIG. 5) connects groove 81 with cylinder 63.

Connected to the end of cylinder 59 is a smaller bore 127 (FIG. 2) having a conical end portion 129. A port 131 connects bore 127 with groove 85. A plurality of ports 133 (FIG. 2) connect groove 85 with a plurality of bores 135 (FIG. 4) having conical end portions 137 therein. There is one bore 135 for every cylinder 69 and the conical ends of such bores are connected by ports 139 with the cylinders 69 (FIG. 4).

Connected to the end of cylinder 63 (FIG. 5) is a smaller bore 141 having a conical end portion 143. A port 145 connects bore 141 with groove 89. A plurality of ports 147 connect groove 89 with a plurality of bores 149 having conical end portions 151 therein. There is one bore 149 for each cylinder 73 and the conical ends of such bores are connected by ports 153 with the cylinders 73.

The conical end 129 of bore 127 (FIGS. 2 and 4) is connected by a port 155 to an enlarged bore 157, closed at its outer end by a plug 159. Bore 157 is connected by an elongated port 161 to the cylinder 59. A plug 163 closes the outer end of cylinder 59.

A port 165 (FIG. 5) connects the conical end 143 of bore 141 with an enlarged bore 167. Bore 167 is closed at its outer end by a plug 169 and an elongated port 171 connects bore 167 with cylinder 63. A plug 173 closes the outer end of cylinder 63.

It will be seen that the inlet 25 (FIG. 5) is connected by port 113, groove 81 and port 125 to the rear control cylinder 63. The bores 141 and 149 are connected by ports 145 and 147, groove 89 and port 115 to the outlet 29. Inlet 27 (FIGS. 2 and 4) is connected by the port 111, groove 77 and port 123 to front control cylinder 59. The bores 127 and 135 are connected by ports 131 and 133, groove 85 and port 117 to the front outlet 31.

The piston 67 (FIG. 2) has a plurality of annular grooves 175, 177, 179, 181 and 183 therein separated by lands 185, 187, 189 and 191. Annular seals 193 are located in grooves 175, 179 and 183 leaving groove 177 free to act as a fluid passage. Groove 181 does not perform any particular function in piston 67.

A transverse port 195 (FIG. 2) extends from groove 177 to a longitudinally extending bore or port 197 in the piston 67. The end of bore 197 is conically shaped and has a check valve 199 therein. If desired, a light positioning spring 198 and retainer may be provided for locating the check valve 199 properly. A valve 201 (FIG. 2) is slideably mounted in bore 135 and has a conically shaped tip portion 202 biased towards seating in the conical end portion 137 of bore 135 by a spring 200 and block communication between port 139 and port 133. A plug 203 closes the outer end of bore 135.

As shown, piston 61 (FIG. 2) has two lands 205 and 207 with an annular sealing ring 209 therebetween located in cylinder 59 and an elongated post 211 attached thereto, extending through bore 127 with a conical valve 213 on the end thereof adapted to seat on the conical portion 129 of bore 127. A seal 215 is located between two lands 217 and 219 on the post 211. An air port 208 is provided to prevent air compression in cylinder 59.

Pistons 71 (FIGS. 3 and 5) are similar to pistons 67 in construction and include annular grooves 221 and 223 the latter of which forms a fluid passage as pointed out hereinafter. A transverse port 225 extends from groove 223 to a longitudinally extending bore or port 227. The bore 227 has a conical end portion 229 in which a check valve 231 is located. Check valve 231 may be biased by a spring 198 toward the seat 229.

Piston 65 (FIG. 5) is similar to piston 61 in construction and includes a valve 233 on the end thereof adapted to seat on the conical portion 143 of bore 141.

Similarly, bore 149 (FIG. 5) has a valve 201a and spring 200a therein which are similar to the valve 201 and spring 200.

Assuming the brake pedal is in its normal retracted position, and then it is applied, operation of the apparatus is as follows:

First, the switch 38 (FIG. 1) is actuated so that the motor 37 is energized from the battery (not shown). This causes shaft 41 (FIG. 2) to rotate and the inner race plate 57 of the swash plate contacts and forces the pumping pistons 67 and 71 sequentially inwardly.

Figure 2:
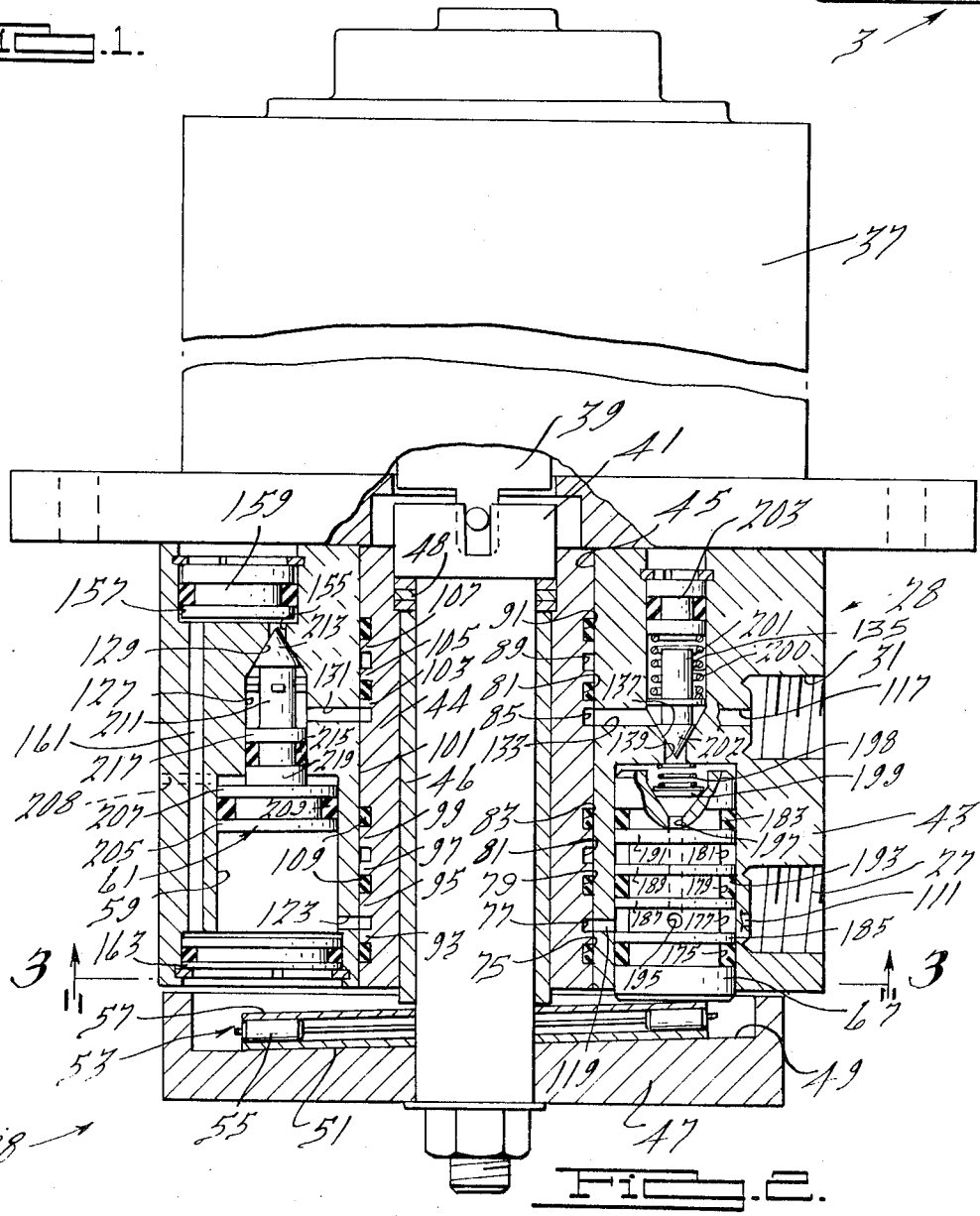
FIG. 2 is an enlarged fragmentary view of FIG. 1 illustrating a booster of this invention, certain parts being broken away and shown in section, the booster shown being rotated 180° from its FIG. 1 position.

As the pedal 15 is pushed to the right as viewed in FIG. 1, fluid is forced out of the master cylinder 13 under a certain pressure (depending upon the pressure applied to the brake pedal) through lines 21 and 23, respectively, to the rear and front inlets 25 and 27 (FIGS. 2 and 5).

Starting with the fluid flow and boost of pressure to the front wheel brakes, the fluid flows from inlet 27 (FIG. 2) through port 111 (FIGS. 2 and 3) to the groove 77 and then from such groove through port 123 (FIG. 2) into control cylinder 59 and through ports 119 (FIGS. 2 and 3) into the four cylinders 69. The port 119 (FIG. 2) is always aligned with groove 177 in piston 67, regardless of the position of the latter. It will be seen that if the pressure applied by the driver is 200 psi, for example, such pressure is applied to the valve 62 (FIG. 2) through the port 111, groove 77 and port 123. This pressure forces the valve 61 to its FIG. 2 position wherein conical nose 213 closes port 155.

Fluid flows from groove 177 (FIG. 2) in each piston 67 through port 195 and into bore 197. If the force (pressure of fluid times area) on the downstream side of check valve 199 is greater than the force (pressure in bore 197 times the area of the bore) on the upstream side of the check valve, the check valve will remain closed.

As soon as the pressure in bore 197 increases the check valve will open, thus causing fluid to flow to the downstream side of piston 67. The pumping action of piston 67 will force fluid through port 139 and cause valve 202 to unseat. Fluid then flows through port 133 (FIG. 2) into groove 85 and from such groove through port 131 into the bore 127. Inasmuch as the force applied to the end of valve 61 in cylinder 59 is greater than the force applied to valve 61 on the opposite side by the fluid in bore 127 and in port 155 by a ratio equal to the ratio of areas exposed to the fluid pressures when the fluid pressure is the same on both sides of the valve, the valve remains in its FIG. 2 position.

Fluid also flows from groove 85 through port 117 (FIG. 2) to outlet 31. From outlet 31 the fluid flows through line 35 (FIG. 1) to the front wheel brakes 9.

As the pistons 67 (FIG. 2) are moved inwardly in cylinders 69 the pressure of fluid on the downstream side thereof is increased. When the swash plate lower race plate 57 moves away from a piston 67 the pressure of fluid downstream of each piston 67 drops off and fluid from the master cylinder opens check valve 199, flows to the downstream side of piston 67 and forces the piston outwardly. As it moves outward the check valve 201 closes due to the pressure in bore 135 and the force of spring 200.

The next time each of the pistons 67 (FIG. 2) is moved inwardly by the swash plate the fluid is pumped past the tip 202 into the bore 135, port 133, groove 85, port 131, bore 127 and port 117 and to outlet 31 to the brakes. As the pistons 67 continue to stroke the pressure in the aforenoted passages will continue to increase, thus resulting in a substantial boost of the fluid pressure from the master cylinder to the brakes.

The fluid pressure on the output side of the booster, which is the same as the pressure in bore 127 (FIG. 2), will continue to rise until the pressure on the land 217 times the area thereof is slightly greater than the master cylinder pressure applied to valve 61 times the area thereof. Thus, the pressure in bore 127 must be raised by a multiple equal to the ratio of the net area of valve 61 having master cylinder pressure thereon tending to move it to its FIG. 2 position to the net area of land 217 having boosted pressure therein. For example, if the area ratio is three to one and the master cylinder pressure is 200 psi, the pressure in bore 127 must be raised to slightly over 600 psi before the valve 205 will move from its FIG. 2 position. Thus, the fluid pressure in bore 131 (FIG. 2), groove 85, port 117, outlet 31, line 35 and the brake actuating means 7 will also be raised to 600 psi, i.e., three times the master cylinder output pressure.

As soon as the pressure in bore 127 is raised to that necessary to move valve 61 downwardly as viewed in FIG. 2, fluid will flow past the conical valve 213 into bore 157, and then through port 161 (FIG. 2) to cylinder 59. This prevents the pressure of fluid in the bore 127, port 131, groove 85, port 117, outlet 31, line 35 (FIG. 1), and the brake means 7, from rising above a predetermined multiple of the master cylinder pressure. The valve 213 (FIG. 2) stays unseated as the pistons 67 continue to pump while the driver has the brake pedal applied. Fluid is then pumped in a circuit from cylinder 59 (FIG. 2), through port 123, groove 77, ports 119, grooves 177 in pistons 67, ports 195, bores 197, past check valves 199, through ports 139, around valve tips 202, through ports 133, groove 85, port 131, bore 127, past tip 213, through port 155, bore 157, and bore 161 back to the cylinder 59.

If the pressure from the master cylinder is increased the valve 61 (FIG. 2) will move upwardly and close port 155, and the pressure in the bore 127, and hence supplied to the brake actuating means 7, will be increased until the pressure therein is the predetermined (by area ratio) multiple greater than the master cylinder pressure.

As soon as the brake pedal is released, the motor 37 will be de-energized. The pressure from the master cylinder drops off and the higher pressure fluid in bore 127 will cause the valve 61 to move downwardly from FIG. 2 position and dumping fluid through port 155, bore 157 and bore 161 back to cylinder 59 and through the passages 123 (FIG. 2), 77, 111, 27 and 23 (FIG. 1) back to the master cylinder.

The fluid flow and boost provided to the rear brakes 9 is accomplished in substantially the same way as described above with respect to the front brakes, only the fluid flows from the master cylinder 13 through line 21 to inlet 25. The path through the booster is then through port 113 (FIG. 5), groove 81 and port 125 into the control cylinder 63. It also flows through the two ports 121 (FIG. 5) to the grooves 223 in pistons 71 and then through ports 225 and bores 227 to and past check valve 231. The path for the fluid is next through port 153 (FIG. 5), past valve tip 202 (FIG. 5), into bore 149 and then through port 147 to groove 89 in sleeve 44. From the groove 89 fluid can flow through port 145 (FIG. 5) to bore 141 and also through 115 to outlet 29 which is connected by line 33 (FIG. 1) to the rear brakes. The operation of the various components associated with boosting the pressure applied to the rear brakes is identical to the operation of similar components for the front brakes which have been described above.

It will be understood that, if desired, suitable and conventional proportioning and metering valves may be incorporated in the lines to permit the proper application of fluid pressure to the front and rear brakes. The maximum output pressure from the booster is the same for both the front and rear brakes, assuming the control valves and cylinders for both are the same size.

A modification of the booster of this invention is generally indicated at 235 in FIG. 6. In this embodiment a plurality of boosters 235, such as one for each wheel, are provided. Each wheel 237 is provided with an annular flange or track 239. The booster 235 is mounted on the vehicle frame or body (not shown) adjacent the inside periphery of the flange 239.

The booster has an inlet 241 connected by a line 243 to one master cylinder outlet. An outlet 245 is connected by a line 247 to the pressure fluid operating means, such as 7, for the brake apparatus for the wheel at which the booster is located.

The booster body 235 has a stepped control cylinder 249 closed at one end by a plug 251 and having a control valve 253 therein. Valve 253 is generally similar in construction to the valves 61 and 65 discussed previously, and includes an extension post portion 255 having a conical valve 257 on the end thereof. Suitable lands 259, 261, 263 and 265 and seals 267 and 269 are provided for guiding and sealing the valve. The post portion 255 extends into bore 271.

A port 273 extends from cylinder 249 into a cylinder 275 in which a piston 277 is slideably located. Piston 277 has a plurality of lands 279, 281, 283 and 285 between two of which one seal 287 is located and between the other two of which a seal 289 is positioned. An elongated annular groove 291 is formed between lands 281 and 283.

Piston 277 is adapted to be moved inwardly in cylinder 275 by a driving mechanism 293 comprising a yoke 295 having a roller 297 rotatably mounted thereon. Roller 297 is eccentrically mounted on the yoke and is adapted to roll along the inner periphery of the wheel as the latter rotates. The eccentrically mounted roller 297 will cause the piston 277 to be driven inwardly and permit such piston to be driven outwardly by master cylinder fluid pressure once each revolution.

A transverse port 299 in the piston 277 intersects a longitudinal bore 301 having a conical end 303 in which a check valve 305 biased by a spring 306 is located. A port 307 extends from cylinder 275 to the inner end of a bore 309 which slideably houses a valve 311.

A port 313 extends laterally from bore 309 to the bore 271. Outlet 245 is connected to bore 271 by a port 315.

The valve 257 is adapted to block a port 317 which extends from bore 271 to a bore 319 closed at its outer end by a plug 321. A port 323 connects bore 319 with the port 325 and cylinder 249.

Operation of the booster 235 is generally similar to the control valve and pumping pistons described with respect to the embodiment shown in FIGS. 1–5. However, as shown, booster 235 has only one pumping piston and that piston is driven by the eccentric roller and track arrangement, rather than by a motor driven swash plate. If the brake pedal 15 is in its retracted position, the pressure of fluid in the line 247, passages 315, 313, 307 and the inner end of cylinder 275 is insufficient to push the piston 277 outwardly far enough for roller 297 to contact the track 239. Accordingly, no pumping action takes place. When the brake pedal 15 is applied fluid flows from inlet 241 through port 325, cylinder 249, port 273, recess 275, port 299, bore 301, past check valve 305, port 307, past valve 311, port 313, bore 271 and port 315 to outlet 245. When the pressure in bore 271 bears a predetermined ratio to the master cylinder pressure in cylinder 249 as determined by the areas of the piston 253 to which such pressures are applied, the valve 253 moves upwardly as viewed in FIG. 7 causing fluid to be pumped past valve 257 through port 317, bore 319 and port 323 back to cylinder 249.

It will be noted that as the vehicle slows down and the rotation of the wheel is slower, the pumping action caused by the relationship between roller 297 and flange 239 will become slower. However, until the foot is removed from the pedal the pressure boost provided by the unit will remain. If, after the vehicle is stopped the brake pedal is released and then reapplied, it will be observed that no boost of master cylinder pressure will be obtained. Nevertheless, the master cylinder pressure produced by such reapplication of the brakes will be transmitted directly through the passages 325, 249, 273, 281, 299, 301, 275, 307, 309, 313, 271 and 315 to outlet 245 and to line 247. This will occur any time the pumping action is not taking place and the brake pedal is actuated.

This is also the case with the embodiment shown in FIGS. 1–5. If, for any reason, the motor 37 does not operate, the normally braking achieved by use of the master cylinder only will still be attained. The fluid pressure is transmitted from the master cylinder directly through the fluid passages in the booster to the respective pressure fluid operating means 7 on the brakes 9. However, it will be noted that in the event the vehicle engine stops, the motor 37 is still capable of operation as long as the power supply exists. Thus, the booster will continue to function effectively for many individual operations. This is in contrast to many present booster systems which operate off engine vacuum and which, upon deactivation of the engine, provide only a few boosts, depending upon the reserve provided in a reservoir.

It should also be noted that although an electric motor is shown as the power source for operating the booster in FIGS. 2–5, that other sources are available and could be used, such as a belt driven by the engine, for example.

The booster unit of this invention is relatively small, especially when compared to conventional vacuum type boosters, yet the boost provided is only dependent on the ratio of the areas of the control piston subjected to master cylinder pressure on one side and to the boosted pressure on the other side.

In view of the foregoing it will be seen that the several objects and other advantages of this invention are achieved.

Although two embodiments of the invention have been disclosed and described, it is apparent that other embodiments and modifications of the invention are possible.

I claim:

1. Hydraulic booster apparatus for a hydraulic brake system of a vehicle comprising a housing, an inlet and an outlet in said housing, pressure boosting and control means in said housing, first passage means connecting said inlet to said pressure boosting and control means for supplying fluid to the latter, second passage means connecting said pressure boosting and control means to said outlet for supplying fluid from the pressure boosting and control means to said outlet, means for actuating said pressure boosting and control means to increase the pressure of fluid in said second passage means over the pressure of fluid in said first passage means, and prevent means for preventing the ratio of the pressure of fluid in said second passage means to the pressure of fluid in said first passage means from exceeding a predetermined ratio, said prevent means including a member movable in said housing, a first area of said member being subjected to the pressure of fluid in said first passage means, a second area of said member being subjected to the pressure of fluid in said second passage means, the ratio of said second area to said first area being said predetermined ratio.

2. Hydraulic booster apparatus as set forth in claim 1 wherein said control valve is movable in a cylinder, said cylinder having one portion having one diameter and a second portion having a second diameter, smaller than said one diameter, said first area being in said one portion of said cylinder and said second area being in said second portion, a third passage placing said second portion of said cylinder in communication with said first passage means, said control valve being adapted to move between one position wherein said third passage is blocked and a second position in which said third passage is open.

3. Hydraulic booster apparatus as set forth in claim 1 wherein said fluid boosting and control means includes a pumping piston reciprocable in a cylinder in said housing, said first passage means including a passage therethrough, first movable closure means therein adapted to close said passage when the piston is moved in one direction and to open said passage when the piston is moved in another direction, a bore connected to said cylinder, second closure means therein adapted to prevent the passage of fluid from said cylinder to said front wheel brake fluid outlet when the pressure of the fluid in said front wheel brake outlet is higher than the pressure of fluid in said cylinder.

4. Hydraulic booster apparatus for a hydraulic brake system of a vehicle having front wheel brakes and rear wheel brakes, comprising housing means having a front wheel brake fluid inlet and a front wheel brake outlet, a rear wheel brake inlet and a rear wheel brake outlet, front wheel brake pressure boosting and control means and rear wheel brake pressure boosting and control means in said housing means, first passage means connecting said front wheel brake fluid inlet to said front wheel brake pressure boosting and control means for supplying fluid to the latter, second passage means connecting said front wheel brake pressure boosting and control means to said front wheel brake outlet for supplying fluid from said front wheel brake pressure boosting and control means to said front wheel brake outlet, third passage means connecting said rear wheel brake fluid inlet to said rear wheel brake pressure boosting and control means for supplying fluid to the latter, fourth passage means connecting said rear wheel brake pressure boosting and control means to said rear wheel brake fluid outlet, means for actuating said front and rear wheel brake pressure boosting and control means to increase the pressure of fluid in said second passage means over the pressure of fluid in said first passage means and to increase the pressure of fluid in said fourth passage means over the pressure of fluid in said third passage means, and means for preventing the ratio of the pressure of fluid in said second passage means to the pressure of fluid in said first passage means from exceeding a predetermined ratio and for preventing the ratio of the pressure of fluid in said fourth passage means to the pressure of fluid in said third passage means from exceeding a predetermined ratio.

5. Hydraulic booster apparatus as set forth in claim 4 wherein each of said pressure boosting and control means includes a cylinder in said housing means, a bore having a smaller cross sectional area than said cylinder extending from said one end of said cylinder, a member extending from said cylinder to said bore and being in slideable engagement with the walls of said cylinder and bore.

6. Hydraulic booster apparatus as set forth in claim 4 wherein said rear wheel brake pressure boosting and control means includes a control valve having a first area subject to the pressure of fluid in said third passage means, said control valve being movable in one direction under the influence of the pressure of fluid in said third passage means, and said control valve having a second area, smaller than said first area, subject to the pressure of fluid in said fourth passage means.

7. Hydraulic booster apparatus as set forth in claim 6 wherein said control valve is movable in a cylinder, fifth passage means placing one end of said cylinder adjacent said second area of said control valve in communication with said third passage means, said control valve being adapted to block said fifth passage means when the ratio of the pressure in said fourth passage means to the pressure in said third passage means is below said second mentioned predetermined ratio, said control valve being movable to open said fifth passage means when the ratio of the pressure in said fourth passage means to the pressure on said third passage means exceeds said second mentioned predetermined ratio.

8. Hydraulic booster apparatus as set forth in claim 6 wherein said rear wheel pressure boosting and control means further includes a pumping piston reciprocable in a cylinder in said housing means, said third passage means including a passage therethrough, first movable closure means therein adapted to close said passage when the piston is moved in one direction and to open said passage when the piston is moved in another direction, said fourth passage including a bore connected to said cylinder, second closure means therein adapted to permit the passage of fluid from said rear wheel brake fluid outlet to said cylinder when the pressure of the fluid in said rear wheel brake outlet is higher than the pressure of fluid in said cylinder.

9. Hydraulic booster apparatus as set forth in claim 4 wherein said means for actuating said front and rear wheel brake pressure boosting and control means includes swash plate means, and a plurality of reciprocable pistons, said swash plate being adapted to move said pistons in one direction.

10. Hydraulic booster apparatus for a hydraulic brake system of a vehicle comprising a housing having an inlet and an outlet, control valve means in said housing, first passage means connecting said inlet to one side of said control valve means, at least one pumping piston means in said housing, means for moving said piston means in one direction in said housing, second passage means connecting said one side of said control valve means with said piston means, third passage means connecting said piston means to the opposite side of said control valve means and to said outlet, the pressure of fluid in said third passage means being increased when said piston means is moved in said one direction, fourth passage means connecting said third passage means to said one side of said control valve means, blocking means normally closing said fourth passage means, said blocking means being moved from its normal position to open said fourth passage means when the pressure in said third passage means bear a predetermined relationship to the pressure in said first passage means.

11. Hydraulic booster apparatus as set forth in claim 10 wherein said control valve means includes a valve member having first and second portions, said first portion being exposed to the fluid pressure in said first passage means, the fluid pressure in said first passage means biasing the control valve in one direction, said second portion being exposed to the fluid pressure in said third passage means, the fluid pressure in said third passage means biasing the control valve in a second direction opposite to said one direction, the area of said first portion exposed to the pressure in said first passage means being greater than the area of said second portion exposed to the pressure in said third portion.

12. Hydraulic booster apparatus for a hydraulic brake system of a vehicle comprising a housing, an inlet and an outlet in said housing, pressure boosting and control means in said housing, first passage means connecting said inlet to said pressure boosting and control means for supplying fluid to the latter, second passage means connecting said pressure boosting and control means to said outlet for supplying fluid from the pressure boosting and control means to said outlet, means for actuating said pressure boosting and control means to increase the pressure of fluid in said second passage means over the pressure of fluid in said first passage means, and means for preventing the ratio of the pressure of fluid in said second passage means to the pressure of fluid in said first passage means from exceeding a predetermined ratio, said pressure boosting and control means including a control valve having a first area subject to the pressure of fluid in said first passage means, said control valve being movable in one direction under the influence of the pressure of fluid in said first passage means, and said control valve having a second area, smaller than said first area, subject to the pressure of fluid in said second passage means.

13. Hydraulic booster apparatus for a hydraulic brake system of a vehicle comprising a housing, an inlet and an outlet in said housing, a pressure boosting and control means in said housing, first passage means connecting said inlet to said pressure boosting and control means for supplying fluid to the latter, second passage means connecting said pressure boosting and control means to said outlet for supplying fluid from the pressure boosting and control means to said outlet, means for actuating said pressure boosting and control means to increase the pressure of fluid in said second passage means over the pressure of fluid in said first passage means, and means for preventing the ratio of the pressure of fluid in said second passage means to the pressure of fluid in said first passage means from exceeding a predetermined ratio, said pressure boosting and control means including piston means, said means for actuating said pressure booster and control means including means engageable with said piston means for moving the latter in one direction to increase the pressure of fluid in said second passage means, each of said pressure boosting and control means including a member movable in said housing means, a first area of said member being subjected to the pressure of fluid in one said passage means, and a second area of said member being subjected to the pressure of fluid in another of said passage means, the ratio of said second area to said first area for the respective pressure boosting and control means being the predetermined ratio.

14. Hydraulic booster apparatus for a hydraulic brake system of a vehicle comprising a housing, an inlet and an outlet in said housing, pressure boosting and control means in said housing, first passage means connecting said inlet to said pressure boosting and control means for supplying fluid to the latter, second passage means connecting said pressure boosting and control means to said outlet for supplying fluid from the pressure boosting and control means to said outlet, means for actuating said pressure boosting and control means to increase the pressure of fluid in said second passage means over the pressure of fluid in said first passage means, and means for preventing the ratio of the pressure of fluid in said second passage means to the pressure of fluid in said first passage means from exceeding a predetermined ratio, said pressure boosting and control means including piston means, said means for actuating said pressure booster and control means including means engageable with said piston means for moving the latter in one direction to increase the pressure of fluid in said second passage means, each of said pressure boosting and control means comprising a piston, said piston being movable in one direction to increase the pressure of fluid on one side thereof from a value substantially equal to the pressure of fluid in the inlet associated with such pressure boosting and control means to substantially the pressure of fluid in the outlet associated with such pressure boosting and control means.

* * * * *